US007589984B2

(12) United States Patent
Salomäki

(10) Patent No.: US 7,589,984 B2
(45) Date of Patent: Sep. 15, 2009

(54) METHOD FOR STARTING PULSE WIDTH MODULATION

(75) Inventor: Janne Salomäki, Hyvinkää (FI)

(73) Assignee: ABB OY, Helsinki (FI)

( * ) Notice: Subject to any disclaimer, the term of this patent is extended or adjusted under 35 U.S.C. 154(b) by 416 days.

(21) Appl. No.: 11/656,462

(22) Filed: Jan. 23, 2007

(65) Prior Publication Data

US 2008/0019157 A1    Jan. 24, 2008

(30) Foreign Application Priority Data

Jan. 23, 2006   (EP)   ................................ 06100694

(51) Int. Cl.
*H02M 1/36* (2007.01)
(52) U.S. Cl. ...................................... 363/41
(58) Field of Classification Search ............... 363/41, 363/49; 327/172, 175; 323/235
See application file for complete search history.

(56) References Cited

U.S. PATENT DOCUMENTS

| | | | | |
|---|---|---|---|---|
| 5,661,390 | A * | 8/1997 | Lipo et al. | 318/803 |
| 6,088,246 | A * | 7/2000 | Okuyama et al. | 363/41 |
| 6,122,184 | A * | 9/2000 | Enjeti et al. | 363/47 |
| 6,166,930 | A * | 12/2000 | Czerwinski | 363/44 |
| 7,106,025 | B1 * | 9/2006 | Yin et al. | 318/811 |
| 7,164,254 | B2 * | 1/2007 | Kerkman et al. | 318/812 |
| 7,190,599 | B2 * | 3/2007 | Virolainen et al. | 363/98 |
| 2005/0174812 | A1 * | 8/2005 | Wu | 363/39 |

FOREIGN PATENT DOCUMENTS

EP   0 886 369 A2   12/1998

OTHER PUBLICATIONS

Blasko V., "Analysis of a Hybrid PWM Based on Modified Space-Vector and Triangle-Comparison Methods", IEEE Transactions on Industry Applications, IEEE Service Center, Piscataway, NJ, US, vol. 33, No. 3, May 1997, pp. 756-764.
Yamamoto K., et al., "Comparison between space vector modulation and subharmonic methods for current harmonics of DSP-based permanent-magnet AC servo motor drive system", IEE Proceedings: Electronic Power Applications, Institute of Electrical Engineers, GB, vol. 143, No. 2, Mar. 15, 1996, pp. 151-156.
Lai Y-S et al., "Optimal Common-Mode Voltage Reduction PWM Technique for Inverter Control with Consideration of theDead-Time Effects-Part II: Applications to IM Drives with Diode Front End", IEEE Translations on Industry Applications, IEEE Service Center, Piscataway, NJ, US, vol. 40, No. 6, Nov. 2004, pp. 1613-1620.

(Continued)

*Primary Examiner*—Jeffrey L Sterrett
*Assistant Examiner*—Yemane Mehari
(74) *Attorney, Agent, or Firm*—Buchanan Ingersoll & Rooney PC

(57) ABSTRACT

A method for starting the modulation of a frequency converter, which method comprises the steps of receiving reference voltages ($s_a$, $s_b$, $s_c$; $U_{ref}$), generating output switch commands from the reference voltages. The generation of output switch commands comprises further a step, in which the ratio ($d_z$) of active time ($T_{0+}$) in a modulation period ($T_s$) of selected zero vector and the total active time ($T_{0+}+T_{0-}$) of zero vectors in a modulation period is changed from a first predetermined ratio, which is substantially 0 or 1, to a second predetermined ratio, which is substantially 0.5.

7 Claims, 4 Drawing Sheets

OTHER PUBLICATIONS

European Search Report dated Sep. 8, 2006.

Akagi et al., "Design and Performance of a Passive EMI Filter for Use with a Voltage-Source PWM Inverter Having Sinusoidal Out Voltage and Zero Common-Mode Voltage" IEEE Transactions on Power Electronics, 2004, vol. 19, No. 4, pp. 1069-1076.

N. Hanigovszki, "EMC Output Filters for Adjustable Speed Drives" Ph.D. Dissertation, Inst. Energy Techn., Aalborg, Denmark, Mar. 2005, pp. 150-152.

T. Svensson, "On Modulation and Control of Electronic Power Convertors" Ph.D. Dissertation, Chalmers Univ. of Tech, Gothenburg, Sweden, 1988, 4 pages.

Van Der Broeck et al., "Analysis and Realization of a Pulsewidth Modulator Based on Voltage Space Vectors" IEEE Transactions on Industry Applications, 1988, vol. 24, No. 1, pp. 142-150.

* cited by examiner

METHOD FOR STARTING PULSE WIDTH MODULATION

BACKGROUND OF THE INVENTION

The invention relates to a method for starting the modulation of a frequency converter. More specifically, the invention relates to a method for starting the pulse width modulation of a frequency converter when the frequency converter is equipped with a common-mode output filter.

The output voltage of a pulse-width modulated (PWM) inverter may cause problems in motor drives. Harmonics at the switching frequency and its multiples give rise to additional losses and acoustic noise in the motor, and pulse reflections expose the motor insulations to additional voltage stresses.

These problems can be reduced by adding a sinusoidal LC filter having the cut-off frequency well below the switching frequency to the output of the inverter. Furthermore, to avoid capacitive leakage currents and bearing currents, the filter can be designed to reduce the common-mode voltage.

FIG. 1 shows an output filter that reduces both common-mode (CM) and differential-mode (DM) voltages. The similar topology was originally disclosed in H. Akagi, H. Hasegawa, and T. Doumoto, "Design and performance of a passive EMI filter for use with a voltage-source PWM inverter having sinusoidal output voltage and zero common-mode voltage," *IEEE Trans. Power Electron.*, vol. 19, no. 4, pp. 1069-1076, July 2004.

An LC filter, consisting of a three-phase inductor $L_f$ and three capacitors $C_f$, attenuates high frequencies of the differential-mode inverter output voltage. A CM inductor $L_c$, capacitor $C_c$ and resistor $R_c$ form a common-mode filter, which provides a route for the CM current and reduces the CM voltage at the motor terminals.

However, the common-mode filtering presents a problem. The filter may cause severe oscillation when the modulation is started. Due to the abrupt start of a pulsating CM voltage and zero initial values of the CM voltage and current in the filter, the CM inductor $L_c$ may get saturated in the start. The saturated CM inductor causes high current peaks, which may trigger the overcurrent protection. The problem has been reported in N. Hanigovszki, "EMC output filters for adjustable speed drives," Ph. D. dissertation, Inst. Energy Techn., Aalborg Univ., Aalborg, Denmark, March 2005 for a slightly different filter topology.

FIG. 2(a) shows a modulation start of a 2.2-kW induction motor drive (400 V, 5.0 A, 50 Hz) equipped with the output filter shown in FIG. 1. The highest current peak exceeds 30 A, and the CM inductor becomes saturated. In the worst cases, the oscillation continued for several seconds.

One solution for the starting problem was disclosed in the above Hanigovszki reference. This solution is based on additional hardware, which comprises a dynamic damping circuit consisting of an additional winding of the common-mode inductor, a full-bridge rectifier, a filtering capacitor and a resistive load. The damping circuit solves the starting problem, but it may affect the overall filter performance. Furthermore, the additional hardware makes the damping circuit less attractive with respect to physical size of the hardware and also to expenses.

BRIEF DESCRIPTION OF THE INVENTION

It is an object of the present invention to provide a method that avoids the above-mentioned drawbacks and enables trouble-free starting of a pulse width modulated drive. This object is achieved by a method of the invention that is characterized by what is stated in independent claim 1.

The invention is based on the idea that the average common mode voltage generated by the frequency converter is abruptly set to its minimum or maximum value and then slowly ramped to zero at the start. The CM voltage can be controlled by means of the zero vector. In suboscillation PWM method the selection can be carried out by manipulating voltage references and in space vector PWM (SVPWM) method by dividing the active times of zero vectors such that required effect is achieved.

BRIEF DESCRIPTION OF THE FIGURES

The invention will now be described in more detail by means of preferred embodiments and with reference to the attached drawings, in which.

DETAILED DESCRIPTION OF THE INVENTION

Figure 1:
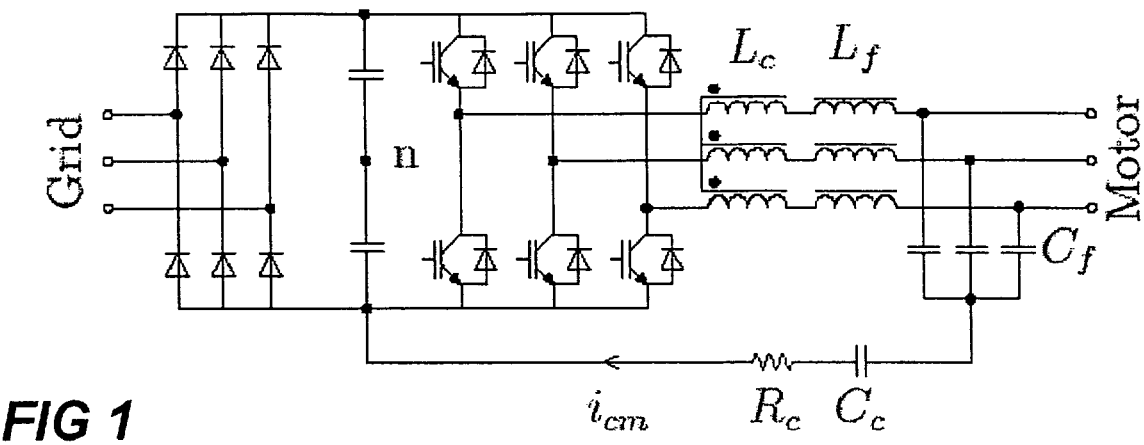
FIG. 1 shows a circuit diagram of frequency converter and output filter.

In the method of the invention, the on-durations or active times of zero vectors are controlled. During the switching period $T_s$, the on-durations of the zero vectors 111 and 000 are denoted by $T_{0+}$ and $T_{0-}$, respectively. A relative duty cycle of the 111 zero vector is defined as $$d_z = \frac{T_{0+}}{T_{0-} + T_{0+}} \quad (1)$$

The ramping of the average CM voltage is achieved by ramping $d_z$ from substantially 0 or 1 to substantially 0.5. Preferably the ramping is done from 0 or 1 to 0.5. The final value $d_z=0.5$ corresponds to the known space vector PWM method, presented in T. Svensson, "On modulation and control of electronic power converters," Ph. D. dissertation, Chalmers Univ. of Tech, Gothenburg, Sweden, 1988. When $d_z$ is 0.5, both zero vectors are used the same time in a switching period. It should be noted, that in the above equation (1) the relative duty cycle of zero vector 111 is presented. In similar manner the equation could be written for zero vector 000. The fact that the relative duty cycle is ramped from 0 to 0.5 means also that the relative duty cycle of the other zero vector is simultaneously ramped from 1 to 0.5, since the sum of the relative duty cycles of different zero vectors is 1.

Figure 3:
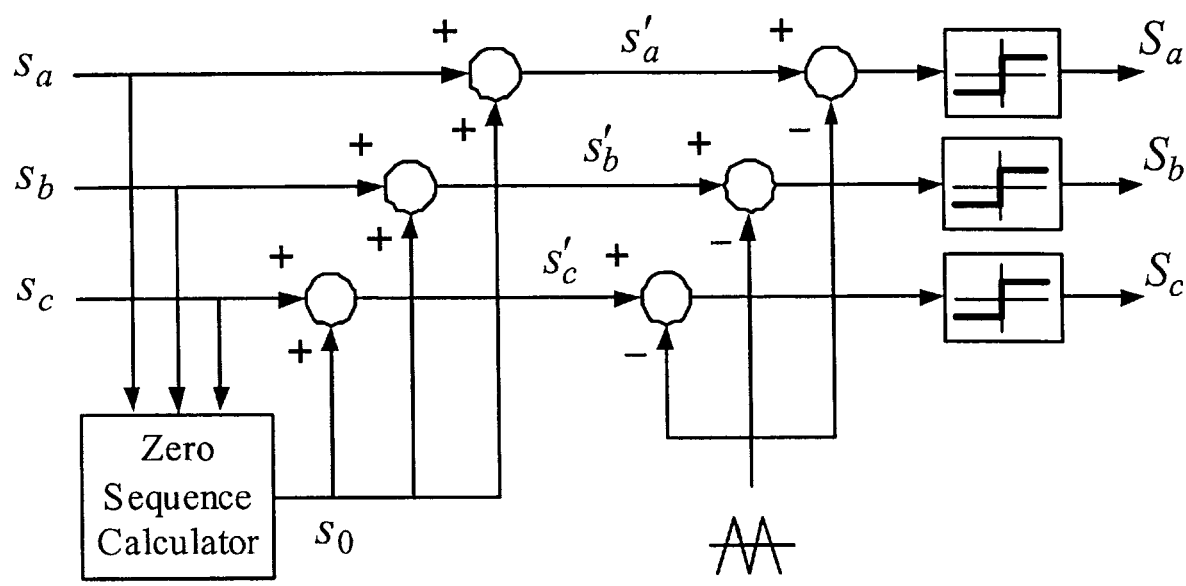
FIG. 3 shows implementation of the method of the invention in connection with suboscillation PWM.

The starting algorithm can be implemented, for example, in the following way in connection with common suboscillation pulse width modulation. FIG. 3 illustrates a triangle-intersection technique with zero-sequence signal injection. The triangle-intersection technique is well known as such.

The inputs to the modulator are the scaled voltage reference signals $$s_x = \frac{2u_x^*}{u_{dc}}, x = a, b, c \quad (2)$$

where $u_x^*$ is the reference phase voltage and $u_{dc}$ is the dc-link voltage. The scaling scales the phase voltages to be in the range of −1 to 1. The peak-to-peak amplitude of the triangle carrier signal is 2. The outputs of the modulator are the switching states for each phase $S_a$, $S_b$, $S_c$, which means that the output switches are controlled according to these switching states.

The zero-sequence signal $s_0$ can be calculated from $d_z$ and the scaled voltage reference signals as $$s_0 = 2d_z - 1 - d_z \max(s_a, s_b, s_c) + (d_z - 1)\min(s_a, s_b, s_c) \quad (3)$$

The zero-sequence signal is added to each scaled voltage reference signal. When a zero sequence signal is added in the above manner, the phase-to-phase voltages are not affected. Thus when a three-phase motor is controlled, the motor sees no difference when a zero sequence signal is added.

The equation (3) is based on the principles of symmetrical suboscillation, which is disclosed in T. Svensson, "On modulation and control of electronic power converters," Ph. D. dissertation, Chalmers Univ. of Tech, Gothenburg, Sweden, 1988. The equation (3) takes into account the changing relative duty cycle $d_z$ and the minimum and maximum values of scaled voltage references.

Figure 4:
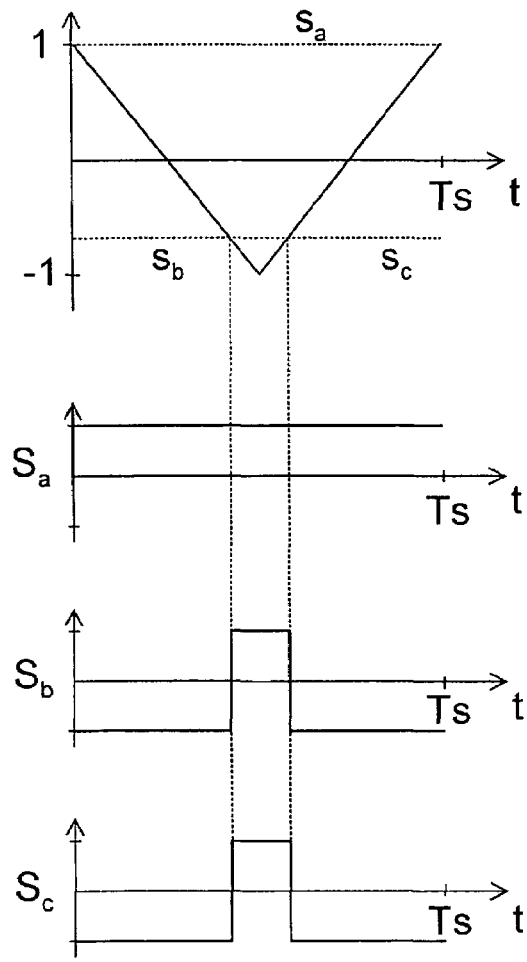
FIG. 4 shows the principle of suboscillation (a) and symmetric suboscillation (b)
Figure 4:
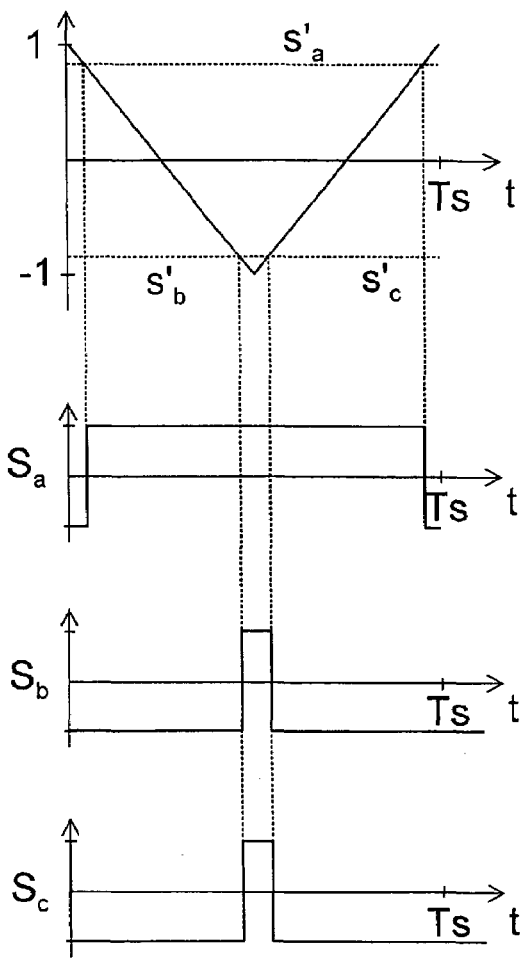

In FIG. 4a) suboscillation i.e. sine-triangle comparison is used and the upper plot shows the scaled reference voltages $s_a$, $s_b$, $s_c$ and the triangle carrier. The lower plots show the switching states $S_a$, $S_b$, $S_c$ for each phase.

In FIG. 4b) symmetrical suboscillation is used, where a zero-sequence signal is added to the scaled voltage references, and the modulation is done with the modified voltage references $s'_a$, $s'_b$, $s'_c$. Similarly lower plots present the switching states. Both switching states of FIGS. 4a) and 4b) produce the same voltage vector. Thus the voltage is not affected. FIGS. 4a) and 4b) are presented to understand the meaning of the symmetrical suboscillation. The lower plots of FIG. 4b) are obtained by adding to the scaled voltage references a zero sequence signal calculated as $$s_0 = \frac{-\min(sa, sb, sc) - \max(sa, sb, sc)}{2}. \quad (4)$$

The minimum and maximum are taken account to ensure that the modified voltage references $s'_a$, $s'_b$, $s'_c$ stay in the range of the triangle carrier.

Figure 5:
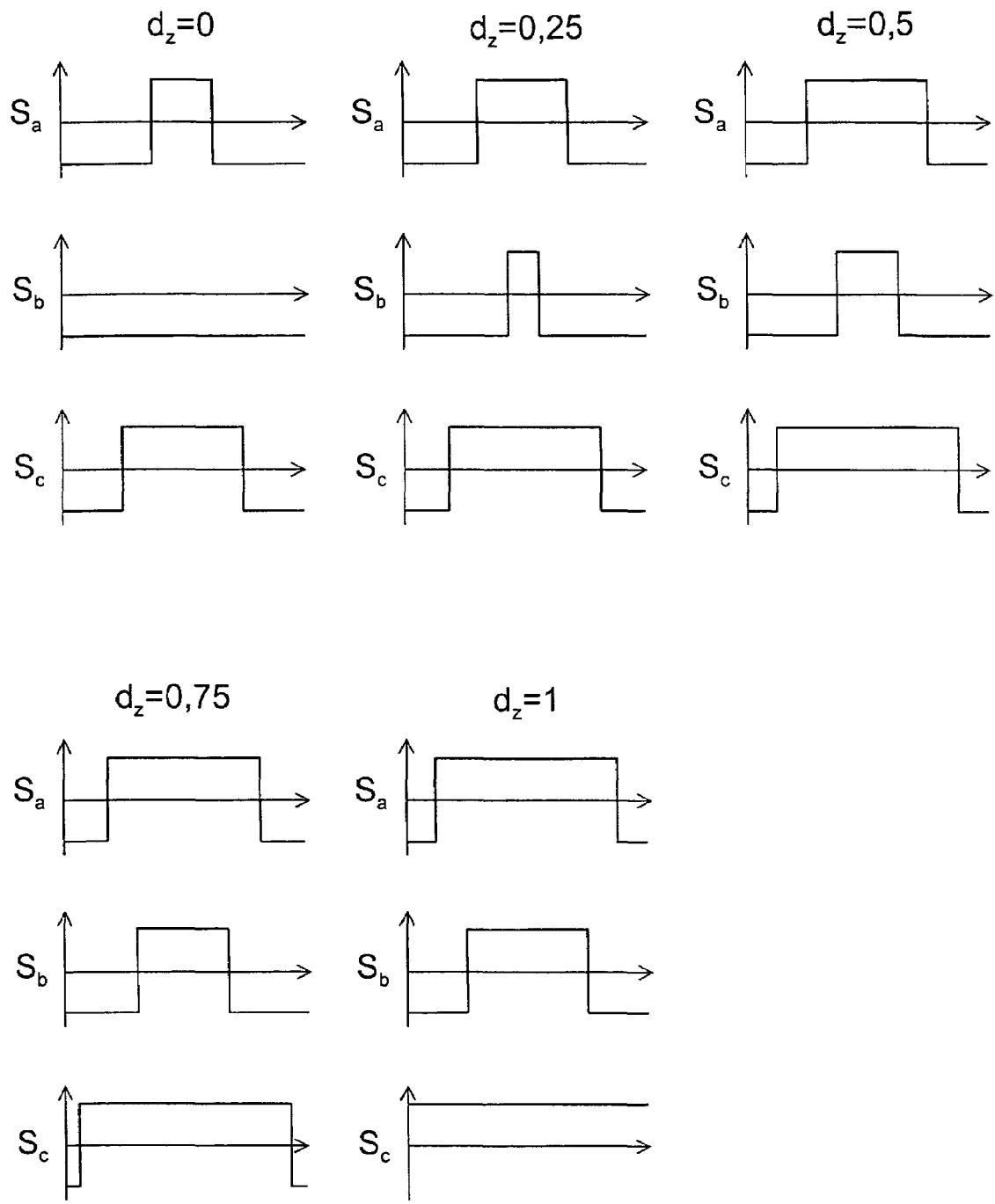
FIG. 5 shows switching states for the same voltage vector with different values of $d_z$.

FIG. 5 shows switching states for the same voltage vector when equation (3) is used to calculate the zero-sequence signal and the value of $d_z$ is changed. When $d_z$ is 0, only one zero vector is used. Similarly when $d_z$ is 1 the other zero vector is used. The situation where $d_z$ is 0.5 corresponds to symmetrical suboscillation, where the zero vectors are used equally.

In connection with a space vector PWM the method of the invention can be used in a following way. In normal space vector PWM the active times for switches can be calculated as $$t_1 = T_s |U_{ref}| \frac{\sqrt{3}}{u_d} \sin\left(\frac{\pi}{3} - \alpha\right) \quad (5)$$

$$t_2 = T_s |U_{ref}| \frac{\sqrt{3}}{u_d} \sin(\alpha)$$

$$t_0 = T_s - t_1 - t_2$$

where $t_1$ and $t_2$ are the active times of active vectors and $t_0$ is the active time for zero vectors, $T_s$ is the modulation period, $U_{ref}$ is the reference voltage vector and $\alpha$ is the angle of the voltage vector. The traditional SVPWM presented in H. W. van der Broeck, H.-C. Skudelny, and G. V. Stanke, "Analysis and realization of a pulsewidth modulator based on voltage space vectors," *IEEE Trans. Ind. Applicat.*, vol. 24, no. 1, pp. 142-150, January/February 1988 is achieved with the following switch sequence when the angle of the voltage vector is in the first sector, i.e. between voltage vectors $U_1$ and $U_2$.

$$\frac{U_0\left(\frac{t_0}{4}\right) \ldots U_1\left(\frac{t_1}{2}\right) \ldots U_2\left(\frac{t_2}{2}\right) \ldots U_7\left(\frac{t_0}{4}\right) \ldots U_7\left(\frac{t_0}{4}\right) \ldots}{T_s} \quad (6)$$

$$\frac{U_2\left(\frac{t_2}{2}\right) \ldots U_1\left(\frac{t_1}{2}\right) \ldots U_0\left(\frac{t_0}{4}\right)}{T_s}$$

In the method of the invention the switching times $t_1$, $t_2$ and $t_0$ are as above. The relative active times of the zero vectors are changed according to the invention. By defining the active time of zero vector $U_0$ to be $T_{0-}$ in one modulation period. Correspondingly the active time of zero vector $U_7$ is then $T_{0+}$. The relative duty cycle of zero vector $U_0$ is then $$d_z = \frac{T_{0+}}{T_{0-} + T_{0+}} = \frac{T_{0+}}{t_0}. \quad (7)$$

By adapting the above we get implementation of the method of the invention in accordance with SVPWM and the switching sequence will be $$U_0\left(\frac{(1-d_z)t_0}{2}\right) \ldots U_1\left(\frac{t_1}{2}\right) \ldots U_2\left(\frac{t_2}{2}\right) \ldots U_7\left(\frac{d_z t_0}{2}\right) \ldots \quad (8)$$

$$U_7\left(\frac{d_z t_0}{2}\right) \ldots U_2\left(\frac{t_2}{2}\right) \ldots U_1\left(\frac{t_1}{2}\right) \ldots U_0\left(\frac{(1-d_z)t_0}{2}\right).$$

The method of invention can thus be implemented in various PWM-methods.

Figure 2:
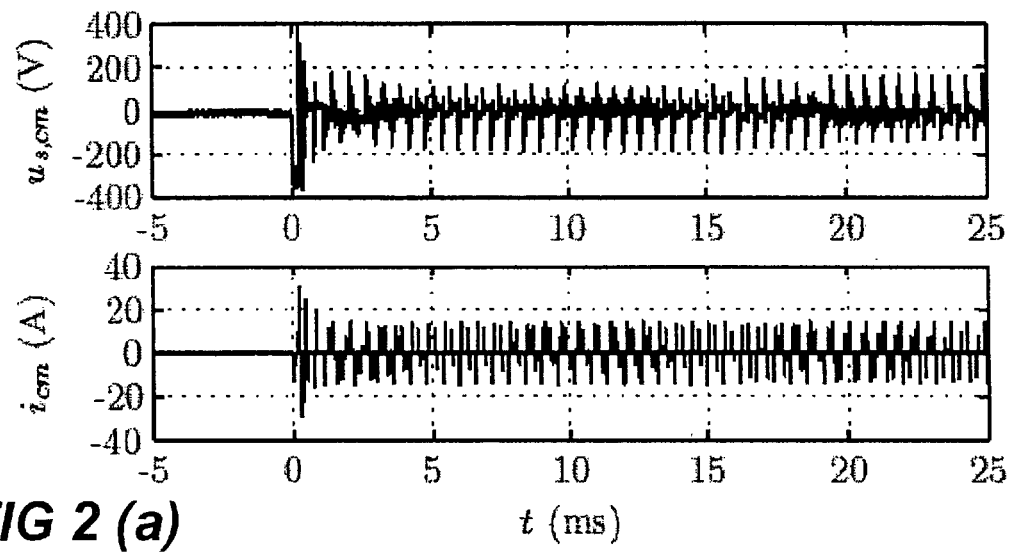
FIG. 2 shows experimental results showing common-mode voltage and common-mode current without (a) and with (b) the method of invention.
Figure 2:
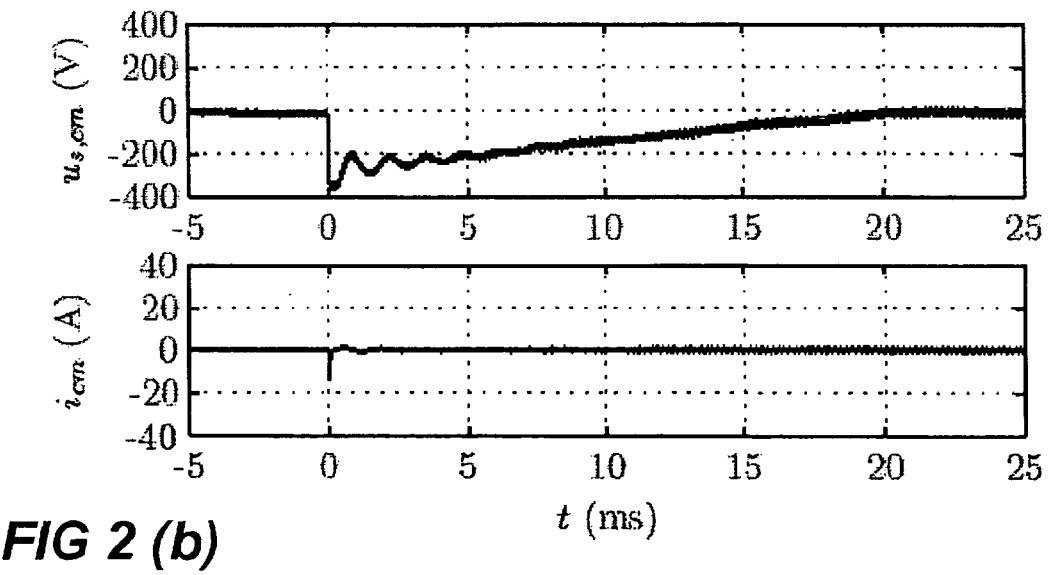

FIG. 2(b) illustrates how the starting algorithm works. The CM voltage is abruptly set to its minimum value by selecting $d_z = 0$ at $t = 0$ s. The ramping of the CM voltage is done by ramping $d_z$ from 0 to 0.5 between $t = 0 \ldots 20$ ms. The severe oscillation is avoided. Only the first CM current peak (amplitude about 13 A) remains. A significant improvement is obtained at the start.

It is obvious to a person skilled in the art that while technology advances, the basic idea of the invention can be implemented in many different ways. The invention and its embodiments are thus not restricted to the examples described above, but can vary within the scope of the claims.

The invention claimed is:

1. A method for starting the modulation of a frequency converter, which method comprises the steps of
receiving reference voltages, and
generating output switch commands from the reference voltages, wherein the generation of output switch commands comprises a step, in which the ratio of active time in a modulation period of selected zero vector and the total active time of zero vectors in a modulation period is changed from a first predetermined ratio, which is substantially 0 or substantially 1, to a second predetermined ratio, which is substantially 0.5.

2. A method according to claim 1, wherein the first predetermined ratio is 0 or 1 and the second predetermined ratio is 0.5.

3. A method according to claim 1, when the modulation is carried out as suboscillation pulse width modulation, wherein the method comprises the steps of
scaling the reference voltages,
calculating a zero sequence signal on the basis of maximum and minimum of the scaled reference voltages and on the basis of ratio of the active time in a modulation period of selected zero vector and the total active time of zero vectors in a modulation period,
adding the zero sequence signal to the scaled reference voltages to obtain modified voltage references, and
producing switching states on the basis of the modified voltage references.

4. A method according to claim 3, wherein the zero sequence signal is calculated using the equation $$s_0 = 2d_z - 1 - d_z \max(s_a, s_b, s_c) + (d_z - 1)\min(s_a, s_b, s_c).$$

5. A method according to claim 1, when the modulation is carried out as space vector pulse width modulation, in which the active switching times of active voltage vectors and of zero vectors are calculated before each modulation period, wherein the method comprises the steps of modifying the active switching times of the zero vectors so, that the ratio of the active time in a modulation period of selected zero vector and the total active time of zero vectors in a modulation period is changed.

6. A method according to claim 2, when the modulation is carried out as suboscillation pulse width modulation, wherein the method comprises the steps of
scaling the reference voltages,
calculating a zero sequence signal on the basis of maximum and minimum of the scaled reference voltages and on the basis of ratio of the active time in a modulation period of selected zero vector and the total active time of zero vectors in a modulation period,
adding the zero sequence signal to the scaled reference voltages to obtain modified voltage references, and
producing switching states on the basis of the modified voltage references.

7. A method according to claim 2, when the modulation is carried out as space vector pulse width modulation, in which the active switching times of active voltage vectors and of zero vectors are calculated before each modulation period, wherein the method comprises the steps of modifying the active switching times of the zero vectors so, that the ratio of the active time in a modulation period of selected zero vector and the total active time of zero vectors in a modulation period is changed.

* * * * *